US011550672B1

(12) United States Patent
Kurian et al.

(10) Patent No.: US 11,550,672 B1
(45) Date of Patent: Jan. 10, 2023

(54) MACHINE LEARNING TO PREDICT CONTAINER FAILURE FOR DATA TRANSACTIONS IN DISTRIBUTED COMPUTING ENVIRONMENT

(71) Applicant: Kyndryl, Inc., New York, NY (US)

(72) Inventors: John Kurian, Bangalore (IN); Jithesh Moothoor, Bangalore (IN); Nageswararao Venkata Gokavarapu, Bangalore (IN); Raghavendran Srinivasan, Bangalore (IN)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/470,366

(22) Filed: Sep. 9, 2021

(51) Int. Cl.
| | | |
|---|---|---|
| G06F 11/00 | (2006.01) | |
| G06F 11/14 | (2006.01) | |
| G06F 11/07 | (2006.01) | |
| G06F 9/455 | (2018.01) | |
| G06F 11/20 | (2006.01) | |

(52) U.S. Cl.
CPC ...... *G06F 11/1471* (2013.01); *G06F 9/45558* (2013.01); *G06F 11/0709* (2013.01); *G06F 11/202* (2013.01); *G06F 11/203* (2013.01); G06F 2009/4557 (2013.01)

(58) Field of Classification Search
CPC .............. G06F 11/0709; G06F 11/1471; G06F 11/202; G06F 11/203
See application file for complete search history.

(56) References Cited

U.S. PATENT DOCUMENTS

| | | | |
|---|---|---|---|
| 8,375,244 B2 | 2/2013 | Bobak et al. | |
| 9,417,977 B2 | 8/2016 | Walter et al. | |
| 2015/0378775 A1 | 12/2015 | Vermeulen | |
| 2019/0163559 A1* | 5/2019 | Takahashi | G06F 11/3006 |
| 2020/0167234 A1 | 5/2020 | Nair et al. | |
| 2021/0117217 A1* | 4/2021 | Croteau | G06F 11/302 |

OTHER PUBLICATIONS

Hultgren et al., "Application failure predictions from neural networks analyzing telemetry data", Uppsala Universitet, Department of Information Technology, Jun. 2021 (Year: 2021).*

(Continued)

*Primary Examiner* — Michael Maskulinski
(74) *Attorney, Agent, or Firm* — John Kennel; Tutunjian & Bitetto, P.C.

(57) ABSTRACT

Inflight transactions having predictable pod failure in distributed computing environments are managed by integrating a transaction manager into pods having containers running applications in a distributed computing environment, wherein the transaction manager records a transaction log having data indicative of historical pod failure. A pod health check that is also integrated into the pods determines predictive pod failure scenarios from the data of historical pod failure in the transaction log. Pod health can be tracked using the pod health checker by matching the predictive pod failure scenarios to transaction calls. Calls may be sent to a load balancer for recovery of pod failure for transaction calling match the predictive pod failure scenarios. Pods can be configured recover for the predictive pod failure.

20 Claims, 9 Drawing Sheets

(56) References Cited

OTHER PUBLICATIONS

Anonymous, "Chapter 7. running a Camel Service on Spring Boot with XA Transactions Red Hat Fuse 7.5," https://access.redhat.com/documentation/en-us/red_hat_fuse/7.5/html/fuse_on_openshift_guid/camel-spring-boot-application-with-xa-transactions, Jun. 2021, 4 pages.

Anonymous, "Method and apparatus to implement high availability for a hybrid application server in a clustered environment," https://ip.com/IPCOM/000240547, Feb. 2015, 7 pages.

Mell, Peter, et al., "The NIST Definition of Cloud Computing," Sep. 2011, 7 pages.

* cited by examiner

MACHINE LEARNING TO PREDICT CONTAINER FAILURE FOR DATA TRANSACTIONS IN DISTRIBUTED COMPUTING ENVIRONMENT

BACKGROUND

The present invention generally relates to managing distributed computing, and more particularly to recovery in transaction processing.

When describing a distributed computing environment, such as a cloud environment, a "container" is a term referring to a unit of software whose packaging includes all the associated dependencies and is designed to run reliably in different computing environments. For example, a docker is a popular open source container platform and docker image is a standalone executable package that comprises application, runtime, system libraries and settings required to run the application. One or more containers get grouped into tightly coupled as logical hosts based on application process requirements referred to as "pods". A pod is a basic deployable object by orchestrator and it is repeatable by design. Pods can be independently brought up or down based on the resource requirements at any point in time through an orchestration environment in the cloud. Kubernetes is an example of an orchestration system for docker containers.

Kubernetes is a portable, extensible, open-source platform for managing containerized workloads and services, that facilitates both declarative configuration and automation. Kubernetes is an example of a distributed system. It treats all the machines in a cluster as a single pool of resources. It takes up the role of a distributed operating system by effectively managing the scheduling, allocating the resources, monitoring the health of the infrastructure, and even maintaining the desired state of infrastructure and workloads. Kubernetes is an operating system capable of running modern applications across multiple clusters and infrastructures on cloud services and private data center environments. Kubernetes include two layers including of the head nodes and worker nodes. The head nodes typically run the control plane responsible for scheduling and managing the life cycle of workloads. The worker nodes act as the workhorses that run applications. The collection of head nodes and worker nodes becomes a cluster. The components of Kubernetes, can include a controller and scheduler.

Management of resources in a cloud orchestrated platform happen automatically based on the workload and application availability requirements preconfigured while deploying the same. Though orchestration is effective for maintenance of resources and workloads deployed in cloud in general, it can result in created unexpected behavior in environments like transaction processing monitor specific pods where recovery of transactions upon failures are crucial to its functioning.

SUMMARY

In accordance with an embodiment of the present invention, a computer-implemented method is provided for managing inflight transactions with predicted pod failures in distributed computing environments. The computer-implemented method may include integrating a transaction manager into pods having containers running applications in a distributed computing environment, wherein the transaction manager records a transaction log having data indicative of historical pod failure. The method may further include integrating a pod health checker into the pods having containers running applications in a distributed computing environment, wherein the pod health checker determines predictive pod failure scenarios from the data of historical pod failure in the transaction log. The pod health can be tracked using the pod health checker matching the predictive pod failure scenarios to transaction calls. In some embodiments, the method can continue with sending calls for recovery of pod failure for the transaction calls match the predictive pod failure scenarios predicted to a load balancer in the distributed computing environment. In some embodiments, the method can include configuring pods to recover for the predictive pod failure with the load balancer.

In another embodiment, a system for managing inflight transactions with predicted pod failures in distributed computing environments is provided that includes a hardware processor; and a memory that stores a computer program product. The computer program product when executed by the hardware processor, causes the hardware processor to integrate a transaction manager into pods having containers running applications in a distributed computing environment, wherein the transaction manager records a transaction log having data indicative of historical pod failure. The system can further integrate a pod health checker into the pods having containers running applications in a distributed computing environment, wherein the pod health checker determines predictive pod failure scenarios from the data of historical pod failure in the transaction log. The system can track pod health using the pod health checker matching the predictive pod failure scenarios to transaction calls. In some embodiments, the system may send calls for recovery of pod failure for the transaction calls match the predictive pod failure scenarios predicted to a load balancer in the distributed computing environment. In some embodiments, the system can configure pods to recover for the predictive pod failure with the load balancer.

In yet another embodiment, a computer program product is provided for managing inflight transactions with predicted pod failures in distributed computing environments. The computer program product may include a computer readable storage medium. The computer readable storage medium may have computer readable program code embodied therewith, the program instructions executable by a processor to cause the processor to integrate, using the processor, a transaction manager into pods having containers running applications in a distributed computing environment. The transaction manager records a transaction log having data indicative of historical pod failure. The computer program product can further integrate, using the processor, a pod health checker into the pods having containers running applications in a distributed computing environment. The pod health checker determines predictive pod failure scenarios from the data of historical pod failure in the transaction log. The computer program product can also track pod health using the pod health checker matching the predictive pod failure scenarios to transaction calls. In some embodiments, the computer program product, using the processor, may send calls for recovery of pod failure for the transaction calls match the predictive pod failure scenarios predicted to a load balancer in the distributed computing environment. In some embodiments, the computer program product, using the processor, can configure pods to recover for the predictive pod failure with the load balancer.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
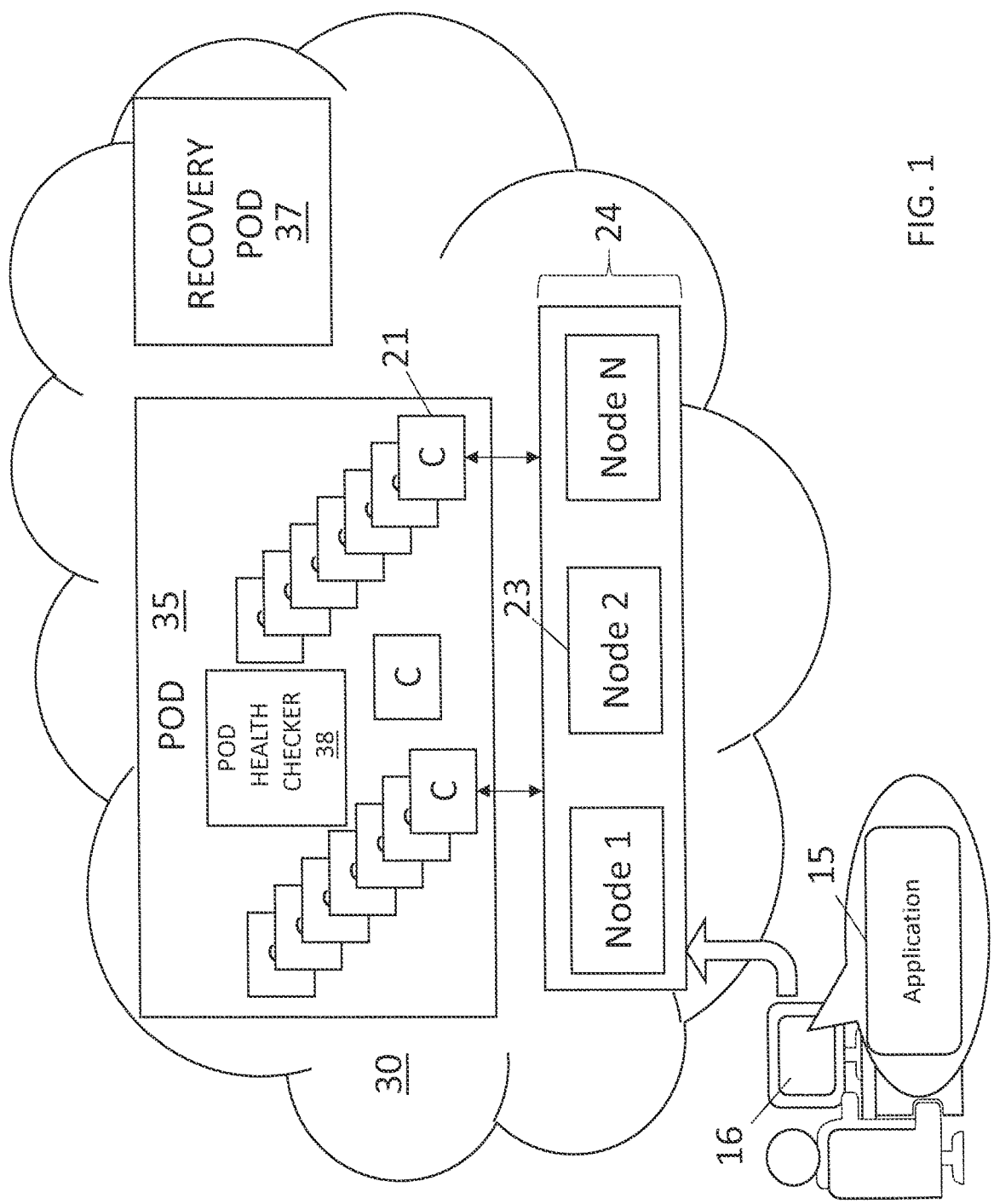
FIG. 1 is a diagram illustrating an exemplary environment for a system and method to complete inflight transactions with predicted pod failures, in accordance with one embodiment of the present disclosure.

The methods, systems and computer program products described herein are directed to systems and methods to complete the inflight transactions with predicted pod failures.

Pods are the smallest, most basic deployable objects in Kubernetes. A pod represents a single instance of a running process in a cluster. Pods contain one or more containers, such as docker containers. When a pod runs multiple containers, the containers are managed as a single entity and share the pod's resources. Pods also contain shared networking and storage resources for their containers. For a network, pods are automatically assigned unique IP addresses. Pod containers share the same network namespace, including IP address and network ports. Containers in a pod communicate with each other inside the pod on localhost. For storage, pods can specify a set of shared storage volumes that can be shared among the containers. In some embodiments, a pod may be considered a self-contained, isolated "logical host" that contains the systemic needs of the application it serves. A pod is meant to run a single instance of your application. Generally, a set of identical pods, called replicas, run an application. Such a set of replicated pods are created and managed by a controller, such as a deployment. Controllers manage the lifecycle of their constituent pods and can also perform horizontal scaling, changing the number of pods, as necessary. Pods run on nodes in your cluster. Once created, a pod remains on its node until its process is complete, the pod is deleted, the pod is evicted from the node due to lack of resources, or the node fails. If a node fails, pods on the node are automatically scheduled for deletion.

Fast recovery is a requirement in the transaction processing environment of Kubernetes. Fast recovery provides recoverable resources in a logical unit of work. When transactions are left in an incomplete state upon abnormal termination of a pod, the subsequent instances of transaction will also get impacted if those instances works on the same recoverable resource.

As a part of the normal process, recovery happens when the pod restarts after its failure and the transaction manager running in the pod can recover the incomplete transactions before starting its normal operations. However, in specific cases the cloud orchestrated environment can decide not to start a pod after failure due to lower incoming workloads or repeated failure in its attempt to restart pod due to shortage of resources or the corruption of transaction manager resources. This can result in transactions and data remaining in an unrecovered state for an indeterminate period of time.

The methods, systems and computer program products of the present disclosure complete inflight transactions with predicted pod failures. In some embodiments, the methods, systems and computer program products employ a pod health check detect to collect the recovery information from transaction logs in cases of predicted pod failure. The pod health check detector checks the pod health at regular intervals and predicts the pod failures based on learning from historical data. If it is predicted that a pod will fail, the methods, systems and computer program products can then route the required details for recovery to a load balancer, and can also request the load balancer to stop routing the transactions to specific pods. In incidents of pod failure, the load balancer will have the transactional recovery data for inflight transactions and it start s recover pods to handle the recovery of the incomplete transactions of failed pods. The "inflight" transactions, are transactions that have started but not completed. The recovery are designed to perform only recovery aspects for the transaction manager, and its availability is controlled by the orchestration environment. In accordance with the methods, systems and computer program products of the present disclosure, transaction recovery is performed more quicker than existing methods of recovery that wait for new pods to be created before the recovery process can begin. In some embodiments, the recovery process of the present method does not wait for a new pod to be generated. The methods, systems and computer program products are now described in greater detail with reference to FIGS. 1-9.

Figure 2:
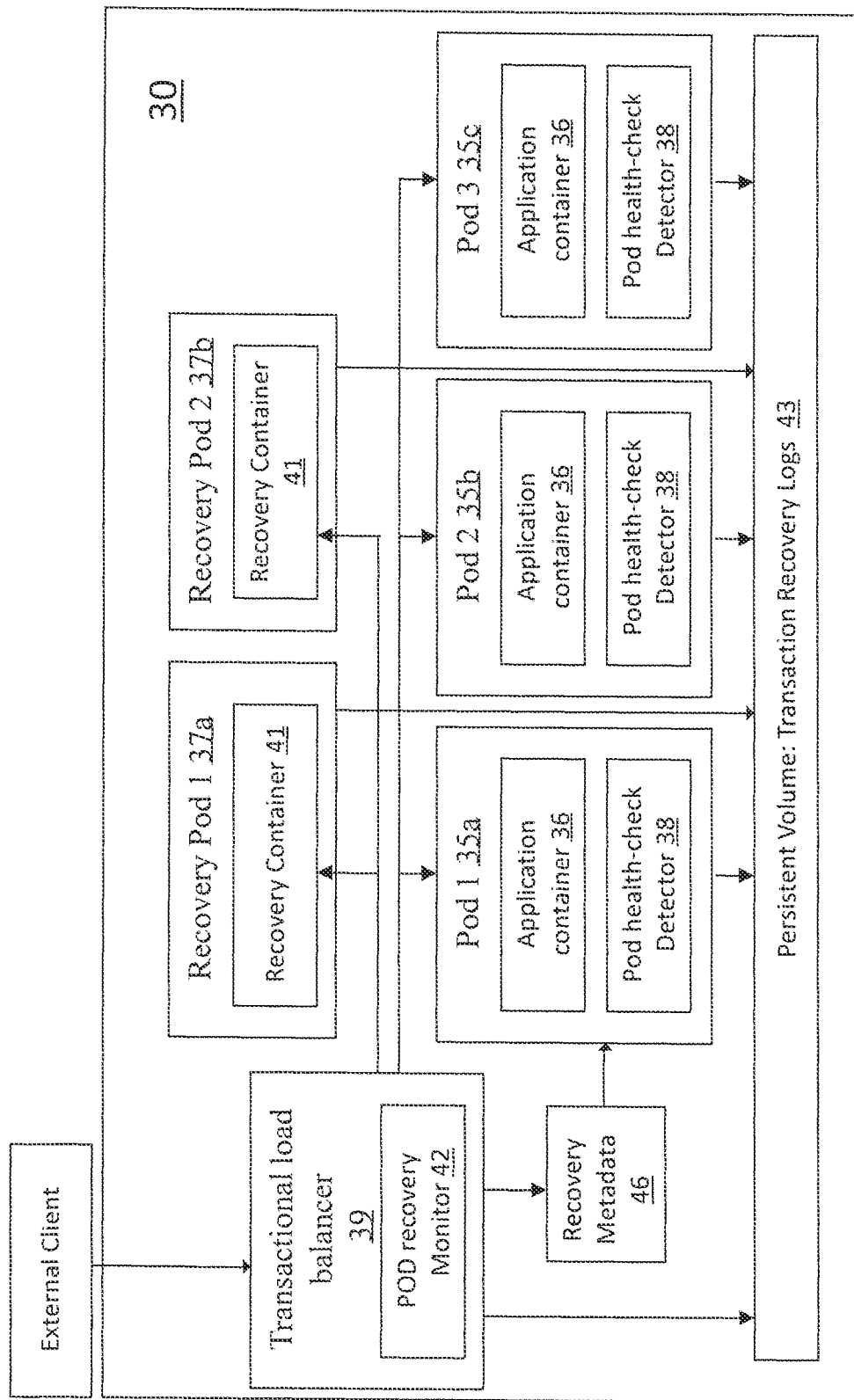
FIG. 2 is a diagram illustrating a system in an exemplary environment for complete inflight transactions with predicted pod failures, in accordance with one embodiment of the present disclosure.
Figure 3:
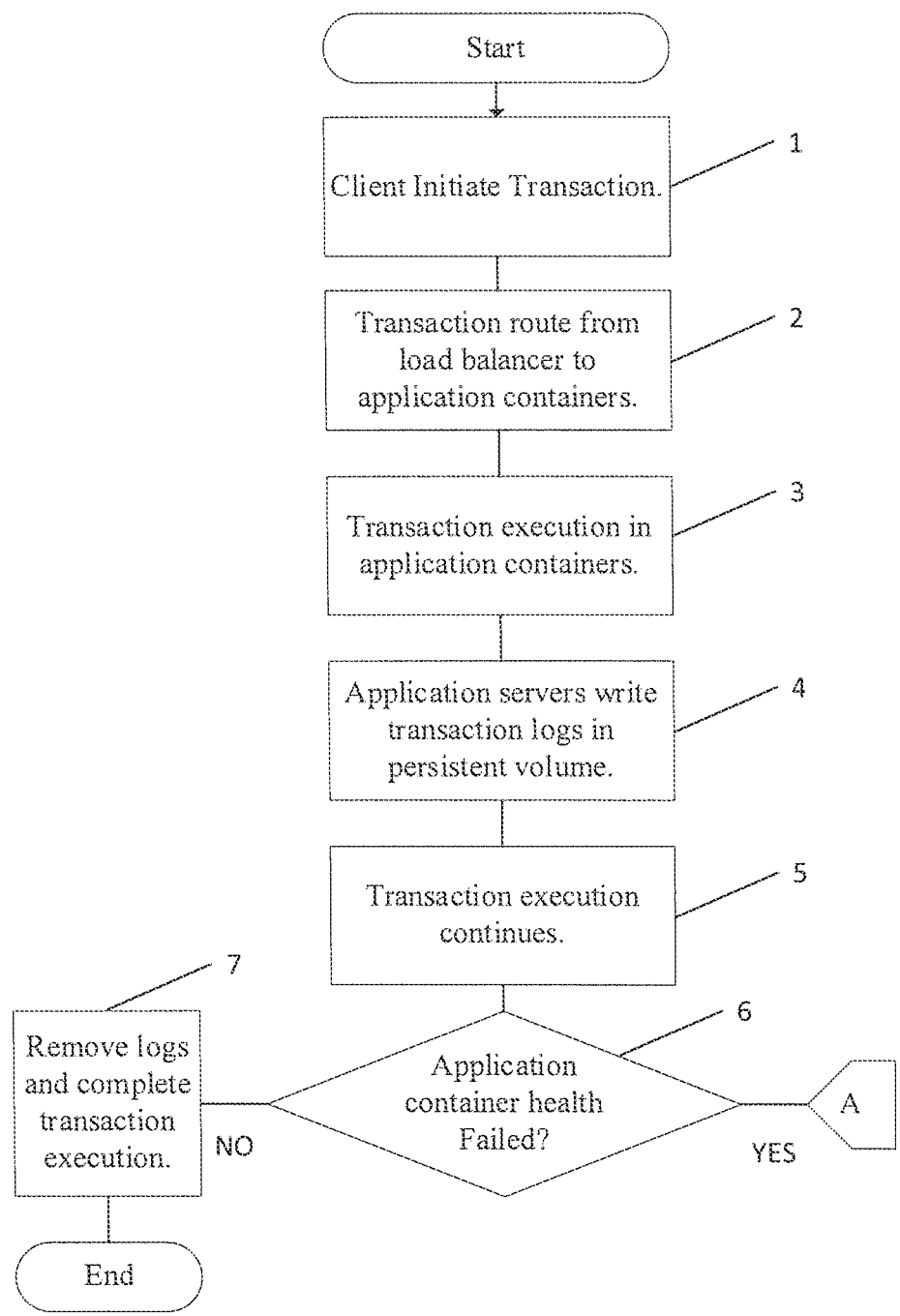
FIG. 3 is a flow chart/block diagram illustrating a method to complete inflight transactions with predicted pod failures including a first parallel threads for running applications in a cloud environment, in accordance with one embodiment of the present disclosure.
Figure 4:
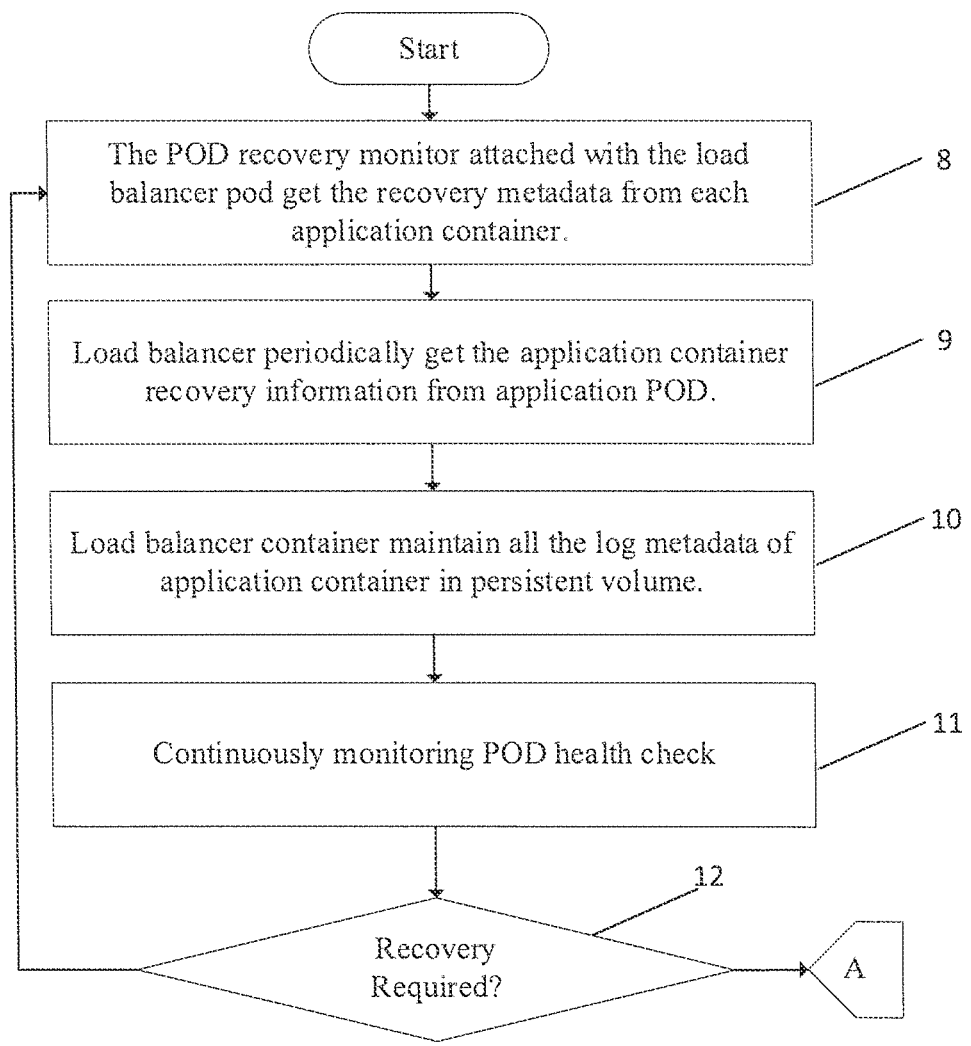
FIG. 4 is a flow chart/block diagram illustrating a method to complete inflight transactions with predicted pod failures including a second parallel threads for running applications in a cloud environment, in accordance with one embodiment of the present disclosure.
Figure 5:
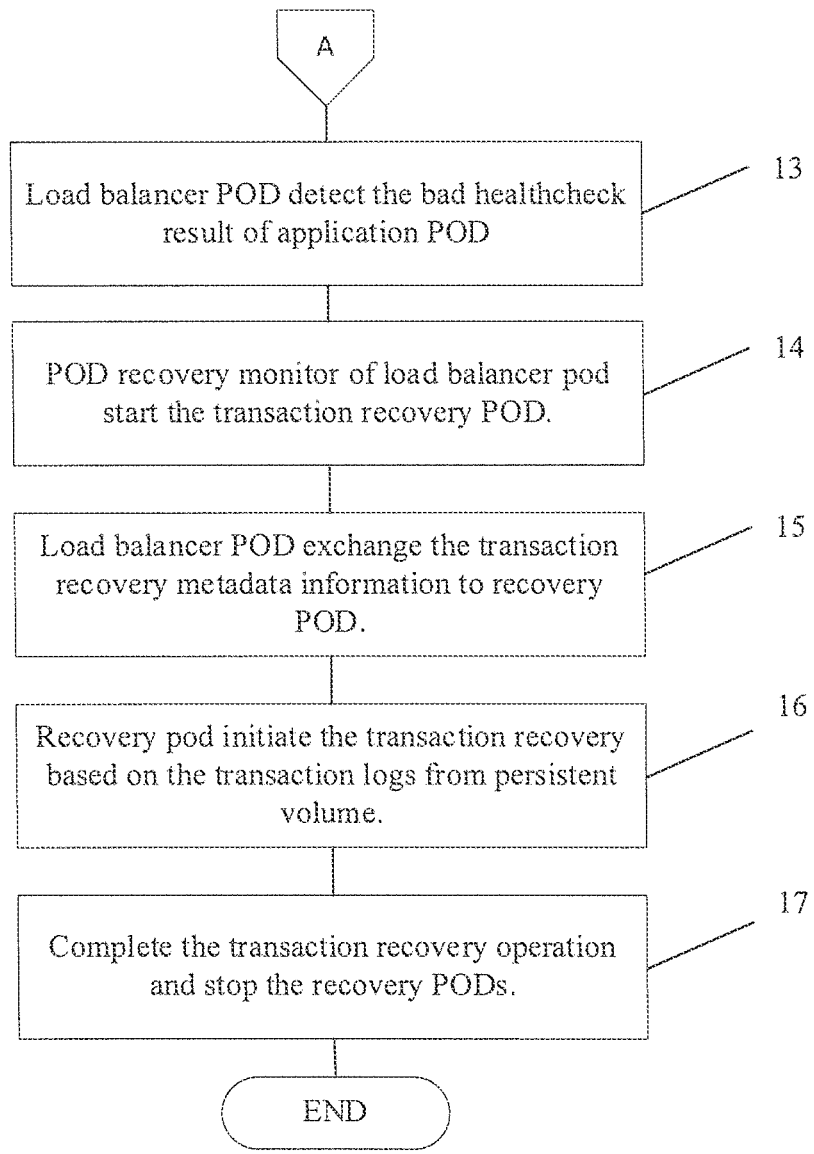
FIG. 5 is a flow chart/block diagram illustrating a method to complete inflight transactions with predicted pod failures including a recovery process, in accordance with one embodiment of the present disclosure.

FIG. 1 illustrates one embodiment of an exemplary environment for a system and method to complete inflight transactions with predicted pod failures. FIG. 2 illustrates one embodiment of a system to complete inflight transactions with predicted pod failures. FIG. 3-5 are flow charts/block diagrams illustrating a method to complete inflight transactions with predicted pod failure.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts one embodiment of an exemplary environment, in which pods 35 are provided including pod health check detectors 38 for completing inflight transactions for predicted pod failures in a distributed computing environment, such as cloud computing environment 30. Nodes 23, e.g., Node 1, Node 2 and Node N, and clusters 24 are the hardware that carries the application 15 deployments in a cloud environment 30. A node 23 can be a server. Nodes 23 store and process data. Nodes 23 can be a physical computer or a virtual machine (VMs). VMs are software programs in the cloud that allow you to emulate a physical computing environment with its own operating system (OS) and applications. A cluster 24 is a group of servers or nodes. A cluster 24 can include a master node, which is a unified endpoint within the cluster, and at least two worker nodes. All of these nodes 23 communicate with each other through a shared network to perform operations. In essence, you can consider them to be a single system.

Applications run on top of a cluster. Containers 21 are a self-contained environment for applications. Containers 21 allow you to package application code separately from the infrastructure it runs on the nodes 23 and clusters 24. This provides the ability to run an application on any computer that uses a containerization platform. It's not tied to a specific node or cluster.

A pod 25 is a higher-level structure that wraps around one or more containers 21. It represents the processes running in on a cluster 24 of virtual machines (nodes). It's a group of containers 21 deployed on the same host with shared resources, including memory and storage capacity. Pods 25 are deployed on nodes 23 within a cluster 24. In some embodiments, nodes 23 collect these pods 25, each of which has a single IP address that's applied to every container 21 wrapped inside of it. Deployments are based on the number of pod replicas needed and launch the application on top of the cluster 24.

FIG. 2 illustrates a transaction processor deployed in a cloud computing environment 30. In the cloud orchestrated environment 30, multiple pods 35a, 35b, 35c are created to handle application requests. A cloud application is software that runs its processing logic and data storage between 2 different systems: client-side and server-side. Some processing takes place on an end user's local hardware, such as a desktop or mobile device, and some takes place on a remote server. One of the benefits of cloud applications is that most data storage exists on a remote server. Users interact with a cloud application can be via a web browser or application programming interface (API) 16. An application request is an request by a user to run a cloud application.

FIG. 2 illustrates three pods, i.e., POD 1 (reference number 35a), POD 2 (reference number 35b), and POD 3 (reference number 35c), and the requests are routed to one of the active pods through the load balancer 39, e.g., Kubernete load balancer. Pods are the basic building blocks of any Kubernetes cluster. Pods can host one or more containers. A Kubernetes Service, e.g., service through the load balancer, acts as a layer above the pods. The load balancer 39 is aware of the pods 35, 35a, 35b, 35c that it manages: their count, their internal IP addresses, the ports they expose and so on.

Referring to FIGS. 1 and 2, the cloud orchestrated environment 30 can detect failures automatically and take the defined actions for pod recover, which can include creation of new pods, redistribution of load to existing pods, and shutting pods down. The load balancer 39 can also scale up and down the pods 35a, 35b, 35c based on load and other defined parameters specific to application requirements. In one example, if a transaction manager is running as an application in a container environment 36 in a pod, it needs addition requirements based on the transaction manager characteristics like persistence storage to preserve the transaction logs. The transaction instances will access recoverable log resources and update the recoverable data as part of the logical unit of work.

The transaction manager will log the transaction status in a persistence database, e.g., blockchain memory, for recovery purposes. In a cloud orchestration setup, the transaction load balancer will route the incoming transaction requests to any of the available identical application containers. The transaction load balancer can also control the number of application containers based on pre-configuration factors like the inflow of transactions, container lifetime, and number of active containers 36. In one example, if a pod abnormally terminates, the application container also terminates. The transaction manager running the application container will abruptly terminate that that results in failure of some in-flight transactions, which are left in an unrecovered state.

Prior to the methods, systems and computer program products of the present disclosure, when a transaction manager abnormally terminates, it recovers the failed inflight transactions in the next restate of the same pod. This process causes delays. Further, if the transaction load balancer decides not to restart the pod after a failure due to lower incoming transaction request flow, the failed inflight transactions during the pod crash will not be able to be recovered. Even further, if a restart of a pod fails, because of insufficient resources, or the dynamic updates made to the configurations in the pod during earlier runtime results in corrupted startup configurations, the failed inflight transactions during the pod crash can not recover. Each of the aforementioned scenarios can result in subsequent transactions to wait indefinitely or fail as recovery resources are locked in update as part of failed transactions.

In the systems, methods and computer program products of the present disclosure, the pods 35a, 35b, 35c in the cloud orchestrated environment 100 have a pod health detector 38, as depicted in FIGS. 1 and 2. The pod health detector 38 checks the health of the pod 35a, 35b, 35c at regular intervals, and uses historical data, pod tunings, and application container tunings to predict the pod crash using artificial intelligence/machine leaning.

The pod heath detector 38 includes a machine learning engine 49 to predict pod crash. Machine learning employs statistical techniques to give computer systems the ability to "learn" (e.g., progressively improve performance on a specific task) with data, without being explicitly programmed. The machine learning method that can be used to form the lighting model for providing the light characteristic light setting in response to an environment factor based input can include decision tree learning, association rule learning, artificial neural networks, deep learning, inductive logic programming, support vector machines, clustering analysis, bayesian networks, reinforcement learning, representation learning, similarity and metric learning, sparse dictionary learning, genetic algorithms, rule-based machine learning, learning classifier systems, and combinations thereof. The remote predictive light setting computing system using machine learning produces a model for providing predictive light characteristics in response to environmental inputs, such as time, weather and calendar date may include a machine learning algorithm that can be selected from the group consisting of: Almeida-Pineda recurrent backpropagation, ALOPEX, backpropagation, bootstrap aggregating, CN2 algorithm, constructing skill trees, dehaene-changeux model, diffusion map, dominance-based rough set approach, dynamic time warping, error-driven learning, evolutionary multimodal optimization, expectation-maximization algorithm, fastICA, forward-backward algorithm, geneRec, genetic algorithm for rule set production, growing self-organizing map, HEXQ, hyper basis function network, IDistance, K-nearest neighbors algorithm, kernel methods for vector output, kernel principal component analysis, leabra, Linde-Buzo-Gray algorithm, local outlier factor, logic learning machine, LogitBoost, manifold alignment, minimum redundancy feature selection, mixture of experts, multiple kernel learning, non-negative matrix factorization, online machine learning, out-of-bag error, prefrontal cortex basal ganglia working memory, PVLV, Q-learning, quadratic unconstrained binary optimization, query-level feature, quickprop, radial basis function network, randomized weighted majority algorithm, reinforcement learning, repeated incremental pruning to produce error reduction (RIPPER), Rprop, rule-based machine learning, skill chaining, sparse PCA, state-action-reward-state-action, stochastic gradient descent, structured kNN, T-distributed stochastic neighbor embedding, temporal difference learning, wake-sleep algorithm, weighted majority algorithm (machine learning) and combinations thereof.

In some embodiments, the machine learning engine 49 employs the historical record of pod tunings, and application container tunings to predict the pod crash. More particularly, the transaction managers over the history of the cloud orchestrated environment make a record of pod tuning. This can include the circumstances under which pods have historically failed. This record is stored in persistent volume: transaction recovery logs 43. Using this historical information, the machine learning engine 49 can learn the conditions and scenarios under which pods will fail.

Still referring to FIGS. 1 and 2, in some embodiments of the methods, systems and computer program products described herein, the pod health check detector 38 will collect the recovery transaction logs that reside in a persistence volume 41, which are related to a transaction manager running in an application container 36. The collected transaction logs are then fed into the machine learning engine 49. The pod health checker 38 having the machine learning engine 49 provides scenarios of possible pod failure, which is checked against transaction calls as they are occurring. In this manner, the pod health checker 38 not only predicts scenarios for pod failure, but also matches the potential scenarios with the transaction calls so that recovery can be readily achieved without delay.

In case of predicted pod failure, the pod health check detector 38 will send the information to a pod recover monitor 42 of the transactional load balancer running in the pod where the transactional load balancer is running in the application container. The pod health check detector also requests the transaction load balancer 39 to stop sending new requests to the pod that is designed for predicted failure. In the case of pod failure, the POD recovery monitor module 42 will route the data details to a recovery manager container 41 designated to handle only recovery jobs, in which the recovery manager container 41 is running in a separate recovery pod 37a, 37b that is maintained by the orchestration platform 44. Based on the transaction failure log information, e.g., transaction recovery logs 43, the recovery container 41 will attach to the relevant persistence database to recover the transactions. If all inflight transactions are completed from the pod 35a, 35b, 35c and the pod health improves, the transaction load balancer 39 resets the pod state 35a, 35b, 35 and routes new requests to the pods 35a, 35b, 35c.

In some embodiments, the number of recovery transaction managers/recovery pods will be dynamically decided by the orchestrator based on the failure rate of the transactions and the number of identical application containers running transaction managers that reside in the cloud orchestrated environment.

FIGS. 3, 4 and 5 are flow chart/block diagram illustrating a method to complete inflight transactions with predicted pod failure. In some embodiments, the figure depicts the flow of a transaction from a client through a load balancer 39 to a transaction manager/application server running in an application container 36. The flow diagram explains the steps involved for one embodiment for the execution of a transaction instance flow.

FIGS. 3 and 4 illustrate parallel threads for running applications in a cloud environment, in which FIG. 5 illustrates a recovery process when the applications fails.

Referring first to FIG. 3, at block 1, the method may begin with a client 14 initiating a transaction. The transaction in the use of an application through the cloud computing environment 30. The client 15 can interact with the cloud computing environment using an application interface (AI) 16.

The method may continue with a transaction being routed from the load balancer container, e.g., a container of the transactional load balancer 39, to an application container 36 of one of the pods 35a, 35b, 35c, at block 2 of the method depicted in FIG. 3.

At block 3, the transaction is executed in an application container 36. This can also be referred to as running an application.

As noted above, the application containers 36 are present in the pods 35a, 35b, 35c of the cloud computing environment. Each pod 35a, 35b, 35c may include a pod health check detector monitor 38. The pod health check detector monitor 38 monitors the application container 36 and its transaction log.

Referring to FIG. 3, the method may include the application servers write a transaction log in the persistent volume 43. Referring to FIGS. 2 and 3, the persistent volume 43 may be any type of memory. For example, the persistent volume 43 may be block chain memory. A "blockchain" is a growing list of records, called blocks, which are linked using cryptography. In some examples, each block contains a cryptographic hash of the previous block, a timestamp, and transaction data (generally represented as a Merkle tree). The idea is that the blockchain keeps the information from being deleted or overwritten.

In the case of predicted pod failure, the pod heath check detector can send the transaction log information of inflight transactions to the load balancer.

At block 5, the execution of the transaction continues, and a determination is made a block 6 of whether the application container health failed. A failure of the application container health can include the application failing to run, or an operation that is intended by proper execution of the application failing to run.

If the application does not fail the heath check, the process continues to removing the transaction logs and completing the transaction at block 7.

On the other hand, if the application does fail at block 6, the method continues to the recovery thread that is illustrated in FIG. 5. It is noted that following block 6 is an off page reference noted as "A". The off page reference "A" illustrates continuity between FIG. 3 at this stage of the process flow, and the beginning of the process flow identified by reference "A" in FIG. 5.

The thread depicted in FIG. 4 is executed parallel to the thread depicted in FIG. 3. Beginning at block 8, the parallel running thread can begin with the POD recovery monitor 42 that is attached to the load balancer pod 39 retrieves the recovery metadata 46 from each application container 36.

At block 9, the load balancer 39 can also retrieve application container recovery information from the application pods 35a, 35b, 35c.

Referring to block 10 of FIG. 4, in a subsequent step, the load balancer container 39 maintains all the log metadata of the application container in the persistent volume, e.g., blockchain memory that can provide the persistent volume of transaction recover logs 43.

The method further includes monitoring the POD health check at block 11, and a determination is made at block 12 if recovery is required. If recovery is not required at block 12, the thread loops back to block 8. If recovery of the pod is required at block 12, the method continues to the recovery thread that is illustrated in FIG. 5. It is noted that following block 12 is an off page reference noted as "A". The off page reference "A" illustrates continuity between FIG. 4 at this stage of the process flow, and the beginning of the process flow identified by reference "A" in FIG. 5.

Referring to FIG. 5, in cases of predicted failure, or failure of a pod, the pod health checker 38 can send the transaction log information of inflight transactions to the load balancer 39. More specifically, the pod health checker 38 can send the transaction log information to the pod recovery monitor module 42 that is running in the pod where the load balancer is running. The process flow depicted in FIG. 5 can begin with the load balancer 39 detecting whether the bad health check is the result of an application POD 35a, 35b, 35c at block 13. Referring to block 14, the method may continue with the load recovery monitor 42 of the load balancer pod 39 starting a transaction recover pod 37a, 37b. In a following step depicted in block 15, the load balancer pod 39 can then exchange the transaction recover metadata 46 to the recovery pod 37a, 37b, as depicted in FIG. 2. At block 16, the recovery pods 37a, 37b can then initiate the transaction recovery based on the transaction logs 43 from the persistent volume, e.g., block chain memory. Block 17 includes complete the transaction, e.g., completing the transaction recovery operation, and stopping (e.g., terminating) the recovery pods 37a, 37b.

Figure 6:
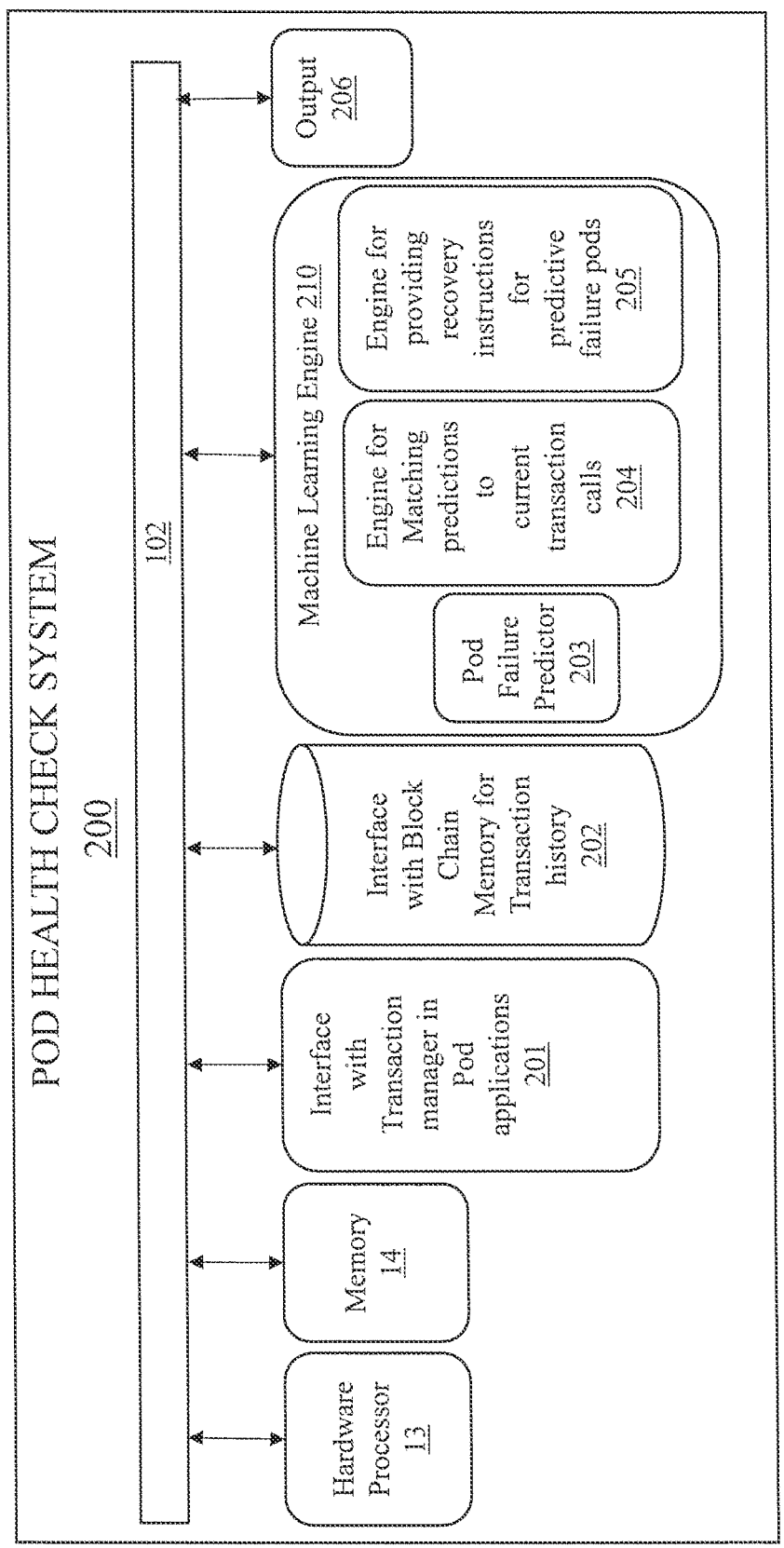
FIG. 6 is a block diagram illustrating a pod health check system as used to complete inflight transactions with predicted pod failures, in accordance with one embodiment of the present disclosure.

FIG. 6 is a block diagram illustrating a pod health check system 200 as used to complete inflight transactions with predicted pod failures. The system for managing inflight transactions with predicted pod failures in distributed computing environments is provided that includes a hardware processor 13; and a memory 14 that stores a computer program product. The computer program product when executed by the hardware processor 13, causes the hardware processor to integrate a transaction manager into pods having containers running applications in a distributed computing environment, wherein the transaction manager records a transaction log having data indicative of historical pod failure. The pod health check system 200 depicted in FIG. 6 includes an interface 201 with the transaction manager of the application pods. The system can further integrate a pod health checker, e.g., the pod health check system 200, into the pods having containers running applications in a distributed computing environment, wherein the pod health checker determines predictive pod failure scenarios from the data of historical pod failure in the transaction log. The system includes an interface with block chain memory for transaction history 202, which may be in contact with the persistent volume: transaction recovery logs 43. The system 200 may include a machine learning engine 205 that includes a pod failure predictor 203. The pod failure predictor 203 uses machine learning to analyze the transaction recovery logs 43 to determine potential scenarios for pod failure.

Still referring to FIG. 6, the system 200 can track pod health using the pod health checker matching the predictive pod failure scenarios to transaction calls. The pod health check system 200 can include a machine learning engine 202 including an engine 204 for matching predictions to current transaction calls, as well as an engine for providing recovery instructions for predictive pod failures 205. The recover instructions may be extracted from the transaction recovery logs 43. In some embodiments, the system may send calls for recovery of pod failure for the transaction calls that match the predictive pod failure scenarios predicted to a load balancer in the distributed computing environment. The pod heath check system 200 includes an output 206 to the load balancer 39. Pods can be configured to recover for the predictive pod failure with the load balancer.

Figure 7:
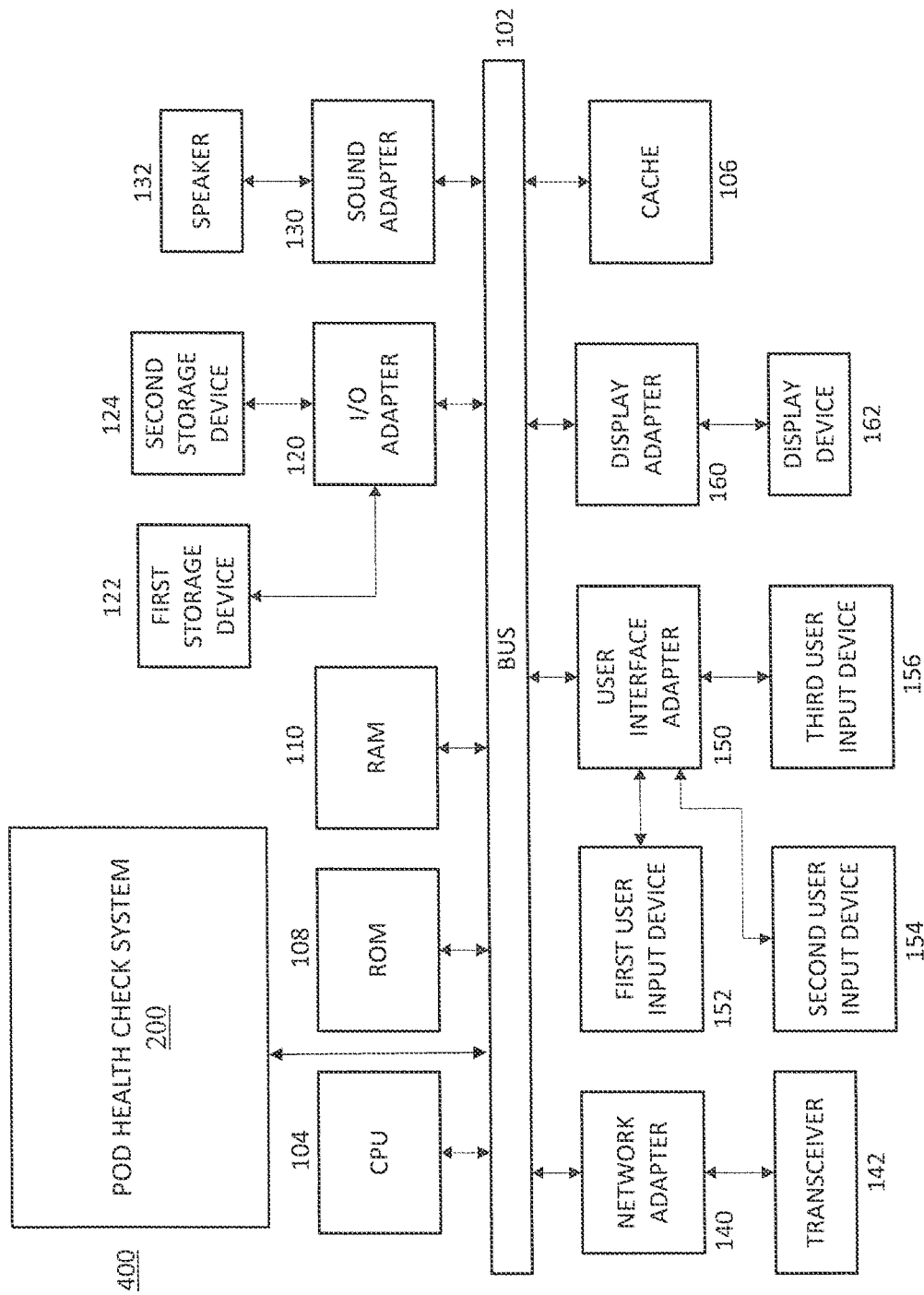
FIG. 7 is a block diagram illustrating a system that can incorporate the system to complete inflight transactions with predicted pod failures, that are depicted in FIG. 6, in accordance with one embodiment of the present disclosure.

FIG. 7 is a block diagram illustrating a process system 400 that can incorporate the system 100 that provides for pod heath check system 200 that is depicted in FIG. 6. FIG. 7 depicts one embodiment of an exemplary processing system 400 to which the present invention may be applied is shown in accordance with one embodiment. The processing system 400 includes at least one processor (CPU) 104 operatively coupled to other components via a system bus 102. The system bus 102 may be in communication with the pod heath check system 200. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. As illustrated, the system 100 that provides for provenance based identification of policy deviations in cloud environments can be integrated into the processing system 400 by connection to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

The present invention may be a system, a method, and/or a computer program product at any possible technical detail level of integration. For example, in some embodiments, a computer program product is provided for managing inflight transactions with predicted pod failures in distributed computing environments. The computer program product may include a computer readable storage medium. The computer readable storage medium may have computer readable program code embodied therewith, the program instructions executable by a processor to cause the processor to integrate, using the processor, a transaction manager into pods having containers running applications in a distributed computing environment. The transaction manager records a transaction log having data indicative of historical pod failure. The computer program product can further integrate, using the processor, a pod health checker into the pods having containers running applications in a distributed computing environment. The pod health checker determines predictive pod failure scenarios from the data of historical pod failure in the transaction log. The computer program product can also track pod health using the pod health checker matching the predictive pod failure scenarios to transaction calls. In some embodiments, the computer program product, using the processor, may send calls for recovery of pod failure for the transaction calls match the predictive pod failure scenarios predicted to a load balancer in the distributed computing environment. In some embodiments, the computer program product, using the processor, can configure pods to recover for the predictive pod failure with the load balancer.

The computer program product may include a computer readable storage medium (or media) having computer readable program instructions thereon for causing a processor to carry out aspects of the present invention. The computer program produce may also be non-transitory.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment (e.g., Internet of thing (IOT)) now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 8:
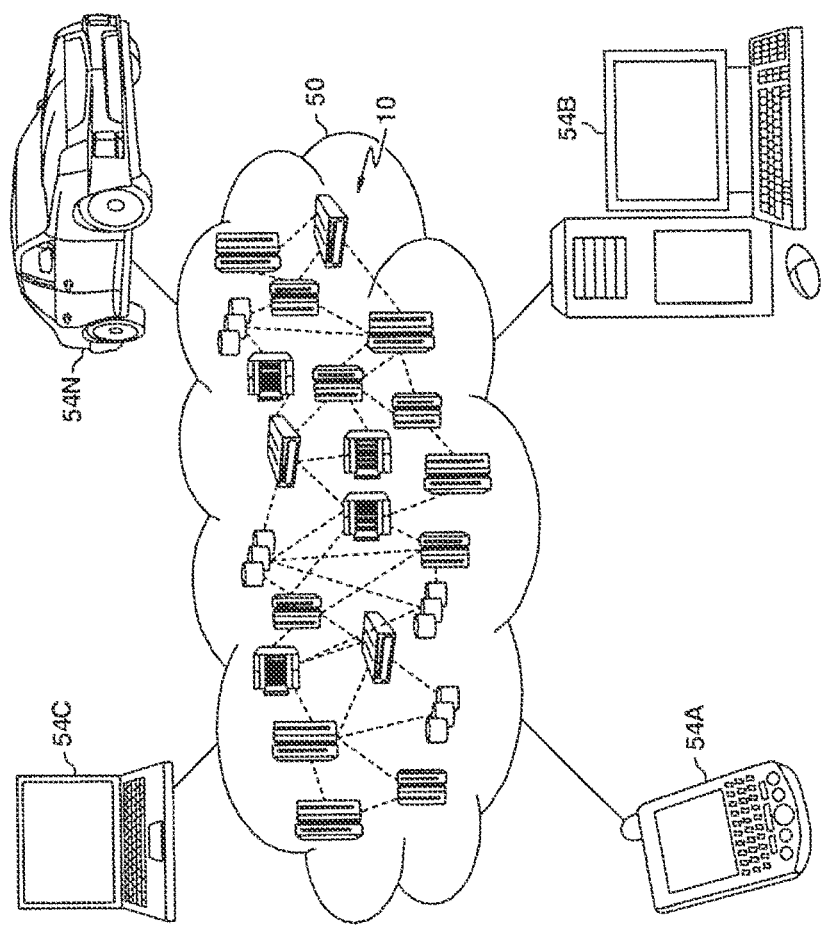
FIG. 8 depicts a cloud computing environment according to an embodiment of the present disclosure.

Referring now to FIG. 8, illustrative cloud computing environment is depicted. As shown, cloud computing environment includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 9:
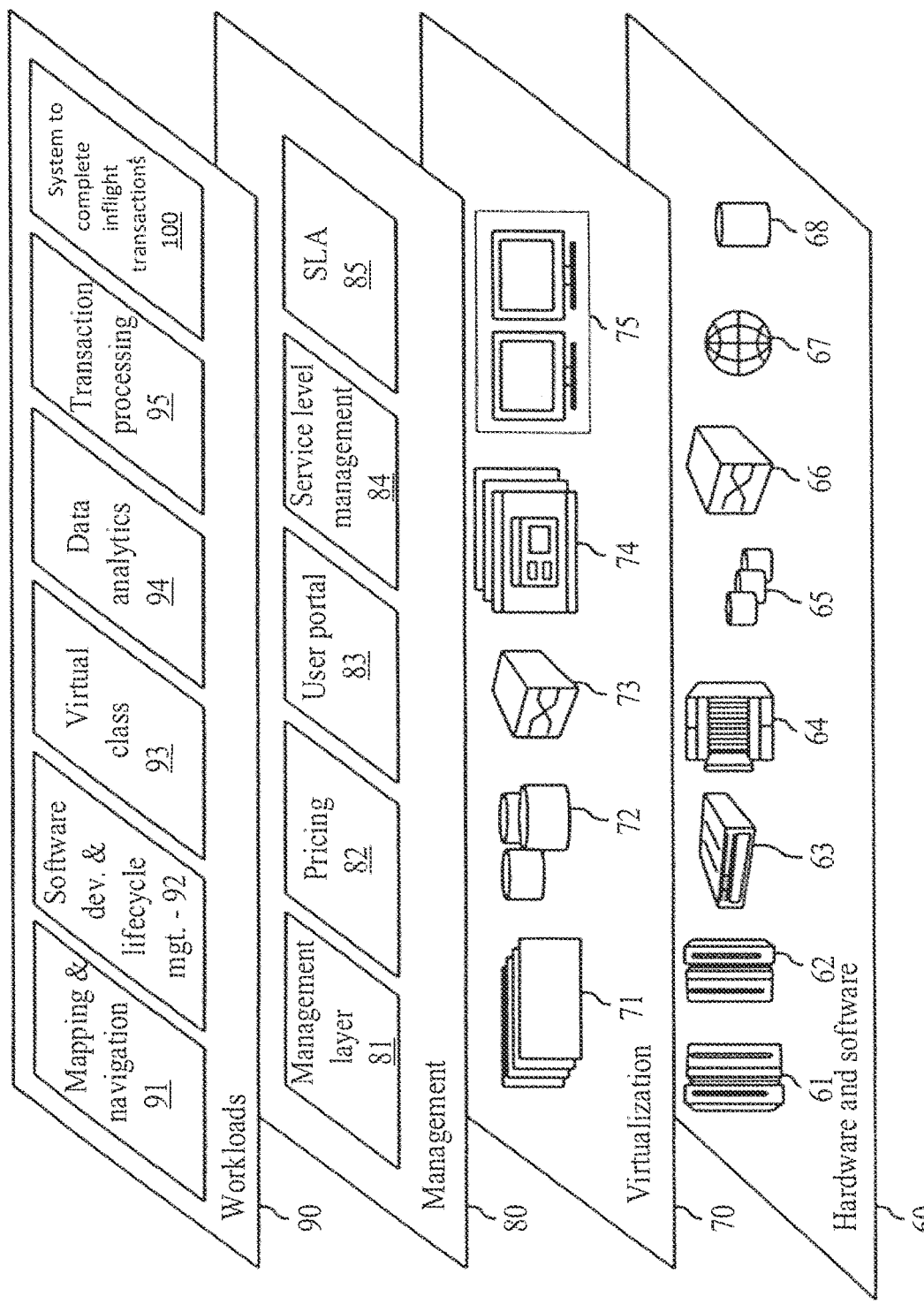
FIG. 9 depicts abstraction model layers according to an embodiment of the present disclosure.

Referring now to FIG. 9, a set of functional abstraction layers provided by cloud computing environment (see FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators.

Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for a system to complete inflight transactions 100 with predicted pod failure in accordance with FIGS. 1-8.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for predicting container failure for data transactions in distributed computing environments (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method is provided for managing inflight transactions with predicted pod failures in distributed computing environments comprising:
   integrating a transaction manager into pods having containers running applications in a distributed computing environment, wherein the transaction manager records a transaction log having data indicative of historical pod failure;
   integrating a pod health checker into the pods having containers running applications in a distributed computing environment, wherein the pod health checker determines predictive pod failure scenarios from the data of historical pod failure in the transaction log;
   tracking pod health using the pod health checker matching the predictive pod failure scenarios to transaction calls;
   sending calls for recovery of pod failure for the transaction calls match the predictive pod failure scenarios predicted to a load balancer in the distributed computing environment; and
   configuring pods to recover for the predictive pod failure with the load balancer.

2. The computer-implemented method of claim 1, wherein the transaction log is stored in block chain memory.

3. The computer-implemented method of claim 1, wherein the pod health checker tracks pod health at intervals during an entirety of the running of the distributed computing environment.

4. The computer implemented method of claim 1, wherein the pod health checker employs a machine learning engine for determining scenarios for the predicted pod failure from the transaction logs.

5. The computer implemented method of claim 1, wherein the pod health checker employs a machine learning engine matching the scenarios for predicted pod failure to transaction calls for applications.

6. The computer implemented method of claim 1, wherein the pod health checker employs a machine learning engine matching the scenarios for extracting pod recovery data from the transaction log for the matching scenarios of predictive pod failure to transaction calls.

7. The computer implemented method of claim 6, wherein the load balancer includes a POD recovery monitor module that will route the pod recovery data to a recovery manager container in a recovery pod, wherein the recovery pod recovers the transaction that resulted in predictive pod failure.

8. The computer-implemented method of claim 1, wherein the distributed computing environment is a cloud computing environment.

9. A system for managing inflight transactions with predicted pod failures in distributed computing environments comprising:
   a hardware processor; and
   a memory that stores a computer program product, which, when executed by the hardware processor, causes the hardware processor to:
   integrate a transaction manager into pods having containers running applications in a distributed computing environment, wherein the transaction manager records a transaction log having data indicative of historical pod failure;
   integrate a pod health checker into the pods having containers running applications in a distributed computing environment, wherein the pod health checker determines predictive pod failure scenarios from the data of historical pod failure in the transaction log;
   track pod health using the pod health checker matching the predictive pod failure scenarios to transaction calls;
   send calls for recovery of pod failure for the transaction calls match the predictive pod failure scenarios predicted to a load balancer in the distributed computing environment; and
   configure pods to recover for the predictive pod failure with the load balancer.

10. The system of claim 9, wherein the transaction log is stored in block chain memory.

11. The system of claim 9, wherein the pod health checker tracks pod health at intervals during an entirety of the running of the distributed computing environment.

12. The system of claim 9, wherein the pod health checker employs a machine learning engine for determining scenarios for the predicted pod failure from the transaction logs.

13. The system of claim 9, wherein the pod health checker employs a machine learning engine matching the scenarios for predicted pod failure to transaction calls for applications.

14. The system of claim 9, wherein the pod health checker employs a machine learning engine matching the scenarios for extracting pod recovery data from the transaction log for the matching scenarios of predictive pod failure to transaction calls.

15. The system of claim 14, wherein the load balancer includes a POD recovery monitor module that will route the pod recovery data to a recovery manager container in a recovery pod, wherein the recovery pod recovers the transaction that resulted in predictive pod failure.

16. The system of claim 9, wherein the distributed computing environment is a cloud computing environment.

17. A computer program product for managing inflight transactions with predicted pod failures in distributed computing environments comprising a computer readable storage medium having computer readable program code embodied therewith, the program instructions executable by a processor to cause the processor to:
   integrate, using a processor, a transaction manager into pods having containers running applications in a distributed computing environment, wherein the transaction manager records a transaction log having data indicative of historical pod failure;
   integrate, using a processor, a pod health checker into the pods having containers running applications in a distributed computing environment, wherein the pod health checker determines predictive pod failure scenarios from the data of historical pod failure in the transaction log;
   track, using a processor, pod health using the pod health checker matching the predictive pod failure scenarios to transaction calls;
   send, using a processor, calls for recovery of pod failure for the transaction calls match the predictive pod failure scenarios predicted to a load balancer in the distributed computing environment; and
   configure, using a processor, pods to recover for the predictive pod failure with the load balancer.

18. The computer program product of claim 17, wherein the pod health checker tracks pod health at intervals during an entirety of the running of the distributed computing environment.

19. The computer program product of claim 17, wherein the pod health checker employs a machine learning engine for determining scenarios for the predicted pod failure from the transaction logs.

20. The computer program product of claim 17, wherein the pod health checker employs a machine learning engine matching the scenarios for predicted pod failure to transaction calls for applications.

* * * * *